US006997001B2

(12) United States Patent
Hirota (10) Patent No.: US 6,997,001 B2
(45) Date of Patent: Feb. 14, 2006

(54) METHOD OF OPERATING A REFRIGERATION CYCLE (75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 4 days.

(21) Appl. No.: 10/604,847

(22) Filed: Aug. 21, 2003

(65) Prior Publication Data
US 2004/0107716 A1 Jun. 10, 2004

(30) Foreign Application Priority Data

Aug. 26, 2002 (JP) ............................. 2002-245291
Jun. 25, 2003 (JP) ............................. 2003-181204

(51) Int. Cl.
*F25B 43/02* (2006.01)

(52) U.S. Cl. .................... 62/192; 62/225; 62/228.5

(58) Field of Classification Search ................. 62/192, 62/193, 204, 222, 223, 224, 225, 228.5, 196.1, 62/196.2, 196.3
See application file for complete search history.

(56) References Cited

U.S. PATENT DOCUMENTS

| 4,697,431 | A | 10/1987 | Alsenz ..................... 62/225 |
| 5,884,497 | A | 3/1999 | Kishita et al. ............. 62/193 |
| 6,266,967 | B1 | 7/2001 | Honda ....................... 62/193 |
| 6,537,037 | B1 * | 3/2003 | Ota et al. ................. 62/228.5 |
| 6,682,314 | B1 * | 1/2004 | Umemura et al. ......... 62/228.5 |

FOREIGN PATENT DOCUMENTS

| EP | 1 091 125 | 4/2001 |
| EP | 1 113 235 | 7/2001 |
| JP | 02-71061 | 3/1990 |
| JP | 08-226716 | 9/1996 |
| JP | 09-99733 | 4/1997 |
| JP | 2001-132650 | 5/2001 |
| JP | 2001-133053 | 5/2001 |
| JP | 2001-153495 | 6/2001 |
| WO | WO02/101237 | 12/2002 |

* cited by examiner

*Primary Examiner*—Harry B. Tanner
(74) *Attorney, Agent, or Firm*—Westerman, Hattori, Daniels & Adrian, LLP (57) ABSTRACT The object of the present invention is to provide a method of operating a refrigeration cycle which is capable of preventing oil from staying in an evaporator and ensures high coefficient of performance as well as sufficient circulation of oil. An electronic expansion valve is controlled such that during normal operation, refrigerant is always in a superheated state at the outlet of an evaporator, and the refrigerant is periodically forced to have negative superheat for a predetermined time by a superheat control device. Thus, during normal operation, the refrigerant sucked into a variable displacement compressor always has superheat, whereby the refrigeration cycle can operate with high coefficient of performance and an engine driving the variable displacement compressor can be operated at high fuel efficiency. Also, the refrigerant is temporarily controlled so as to have negative superheat. Accordingly, lubricating oil stayed in the evaporator can be made to flow out to the variable displacement compressor, thus making it possible to prevent the compressor from seizing due to shortage of the lubricating oil.

14 Claims, 3 Drawing Sheets

METHOD OF OPERATING A REFRIGERATION CYCLE

CROSS-REFERENCE TO RELATED APPLICATIONS

This application claims priority of Japanese Applications No. 2002-245291 filed on Aug. 26, 2002, entitled "Method of Operating a Refrigeration Cycle" and No. 2003-181204 filed on Jun. 25, 2003, entitled "Method of Operating a Refrigeration Cycle"

FIELD OF THE INVENTION

The present invention relates to a method of operating a refrigeration cycle, and more particularly, to a method of operating a refrigeration cycle used in an automotive air conditioning system and provided with an expansion valve and a variable displacement compressor having an electronic capacity control valve.

DESCRIPTION OF THE RELATED ART

Conventional automotive air conditioning systems use a variable displacement compressor which is capable of continuously varying the displacement of refrigerant to be discharged so that even if the rotational speed of the engine varies, the flow rate of the refrigerant flowing through the refrigeration cycle can be kept at a predetermined value corresponding to a cooling or refrigeration load.

As such variable displacement compressors, a swash plate type is known wherein a swash plate is arranged in a hermetically sealed crank chamber such that an angle of inclination thereof is variable relative to a rotary shaft to which the driving force of the engine is transmitted and the inclination angle of the swash plate is changed by controlling the pressure in the crank chamber, to change the stroke of pistons coupled to the swash plate and thereby vary the displacement of refrigerant to be discharged.

The pressure in the crank chamber is controlled by a capacity control valve. In response to the suction pressure of the variable displacement compressor, the capacity control valve controls the pressure to be introduced into the crank chamber from the discharge chamber. For example, if the refrigeration load lowers and the suction pressure drops below a set pressure, the capacity control valve senses the drop in the suction pressure and increases its valve lift, thereby increasing the pressure introduced into the crank chamber from the discharge chamber. As the differential pressure between the pressure in the crank chamber and the suction pressure increases, the inclination angle of the swash plate becomes smaller to decrease the piston stroke, so that the displacement of the variable displacement compressor decreases. Consequently, the suction pressure is controlled to the set pressure, whereby the air outlet temperature of the evaporator can be kept constant.

Figure 3:
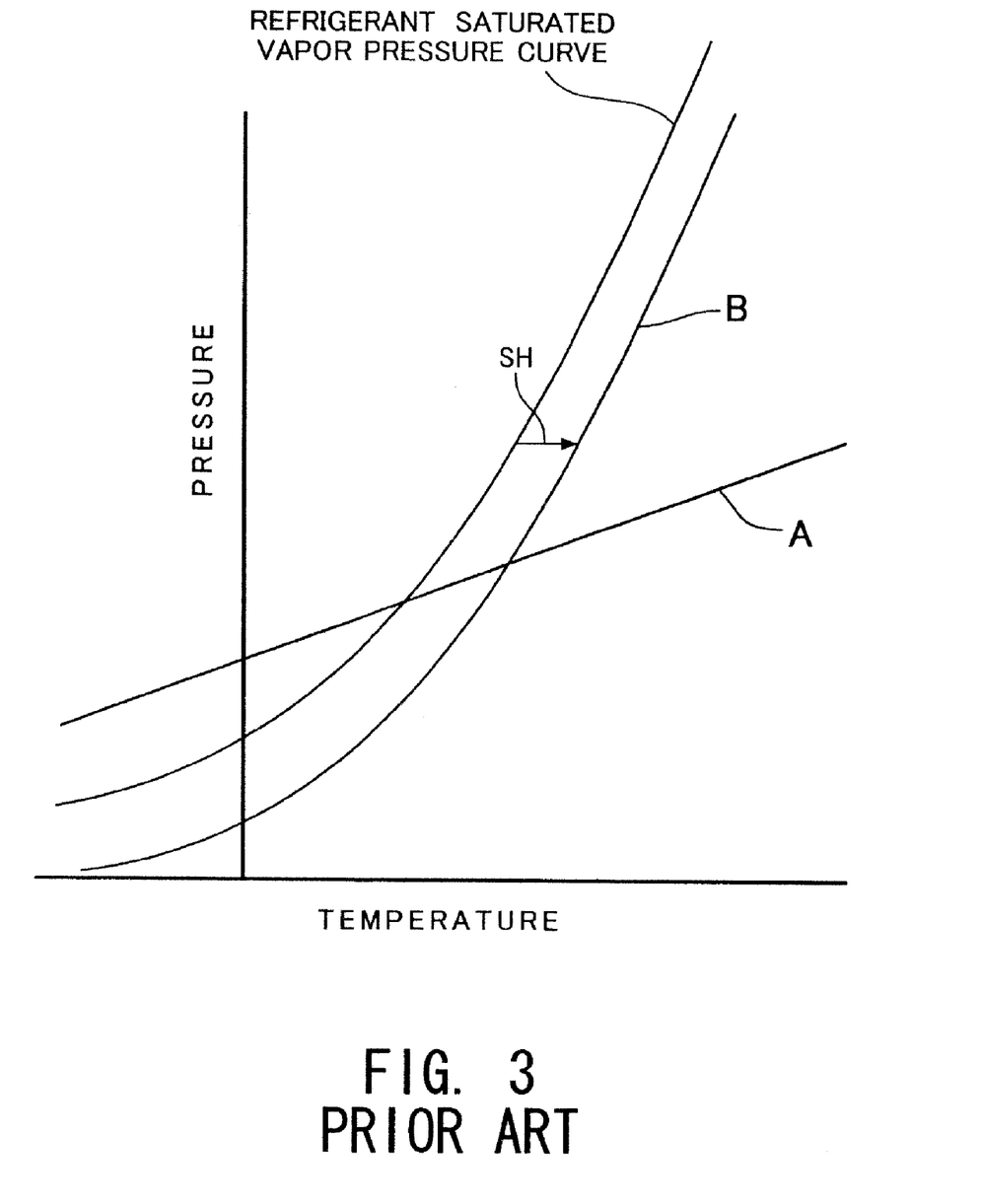
FIG. 3 is a diagram showing characteristics of thermostatic expansion valves.

In a refrigeration cycle using this type of variable displacement compressor whose suction pressure is controlled to a constant value, a cross charged thermostatic expansion valve is used as the expansion valve. In the cross charged thermostatic expansion valve, the pressure in its temperature sensing tube changes at a gradient gentler than that of the curve of saturated vapor pressure of the refrigerant used in the refrigeration cycle, as indicated by characteristic A in FIG. 3 showing characteristics of thermostatic expansion valves.

Where the cross charged thermostatic expansion valve is used, the pressure in the temperature sensing tube is higher than the refrigerant saturated vapor pressure curve during a low-load operation in which the outlet temperature of the evaporator is low, with the result that the expansion valve keeps open and does not respond to the outlet pressure of the evaporator. Accordingly, control of the expansion valve does not conflict with control of the variable displacement compressor whose suction pressure nearly equal to the outlet pressure of the evaporator is controlled to a constant value in a variable displacement range thereof, thus enabling stable control free of hunting.

Also, during a low-load operation, since the expansion valve remains open, the refrigerant at the outlet of the evaporator is not completely evaporated and contains liquid, and the refrigerant in this state is returned to the variable displacement compressor. During a high-load operation, on the other hand, the refrigerant flow rate is high, and therefore, a large amount of lubricating oil which is contained in the refrigerant to lubricate the variable displacement compressor is circulated. Although during a low-load operation the variable displacement compressor operates with small displacement, the refrigerant containing liquid is returned to the compressor, and accordingly, sufficient circulation of lubricating oil is ensured despite low flow rate of the refrigerant, thus preventing the variable displacement compressor from seizing due to shortage of oil.

Besides the constant suction pressure type variable displacement compressor, a flow rate control type variable displacement compressor is also known in which the discharge flow rate of the refrigerant is controlled to a constant value. In a refrigeration cycle using the flow rate control type variable displacement compressor, the cross charged thermostatic expansion valve is also used in order to achieve stable control and to ensure circulation of the lubricating oil during a low-load operation. Where the cross charged thermostatic expansion valve is used as the expansion valve, however, liquid refrigerant returns from the evaporator to the variable displacement compressor during a low-load operation. Consequently, the variable displacement compressor, instead of the evaporator, evaporates the liquid contained in the refrigerant, with the result that the coefficient of performance of the refrigeration cycle lowers, deteriorating the fuel efficiency of the automobile.

There has also been known a refrigeration cycle using a normally charged thermostatic expansion valve whose characteristic is indicated at B in FIG. 3, in combination with the flow rate control type variable displacement compressor (see Japanese Unexamined Patent Publication No. 2001-133053 (Paragraph Nos. [0016] to [0017]; FIGS. 2 and 3), for example).

With the normally charged thermostatic expansion valve, the refrigerant at the outlet of the evaporator always has a higher temperature, or superheat SH, than the curve of saturated vapor pressure of the refrigerant used in the refrigeration cycle, whereby the coefficient of performance improves. Although the use of the normally charged thermostatic expansion valve leads to reduction in the amount of lubricating oil circulated, the flow rate control type variable displacement compressor controls the refrigerant flow rate so as not to drop below a minimum flow rate for securing the amount of lubricating oil that needs to be returned to the compressor, thereby preventing the variable displacement compressor from seizing due to shortage of oil.

In the refrigeration cycle using the flow rate control type variable displacement compressor and the normally charged thermostatic expansion valve, the liquid refrigerant that entered the evaporator is evaporated and the resulting superheated gaseous refrigerant leaves the evaporator. However, the lubricating oil carried with the liquid refrigerant is not completely evaporated and partly remains in the evaporator. Thus, if the refrigeration cycle is operated for a long time in a state such that the refrigerant leaving the evaporator is superheated, the lubricating oil stays in the evaporator and the circulating oil runs short, giving rise to a problem that the variable displacement compressor is eventually damaged due to shortage of oil.

SUMMARY OF THE INVENTION

The present invention was created in view of the above circumstances, and an object thereof is to provide a method of operating a refrigeration cycle which is capable of preventing oil from staying in an evaporator and ensures high coefficient of performance as well as sufficient circulation of oil.

To solve the above problems, the present invention provides a method of operating a refrigeration cycle using an expansion valve and a variable displacement compressor having an electronic capacity control valve. The method of operating a refrigeration cycle is characterized in that during normal operation, the refrigeration cycle is controlled such that refrigerant always has superheat at an outlet of an evaporator, and the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described in detail with reference to the drawings.

Figure 1:
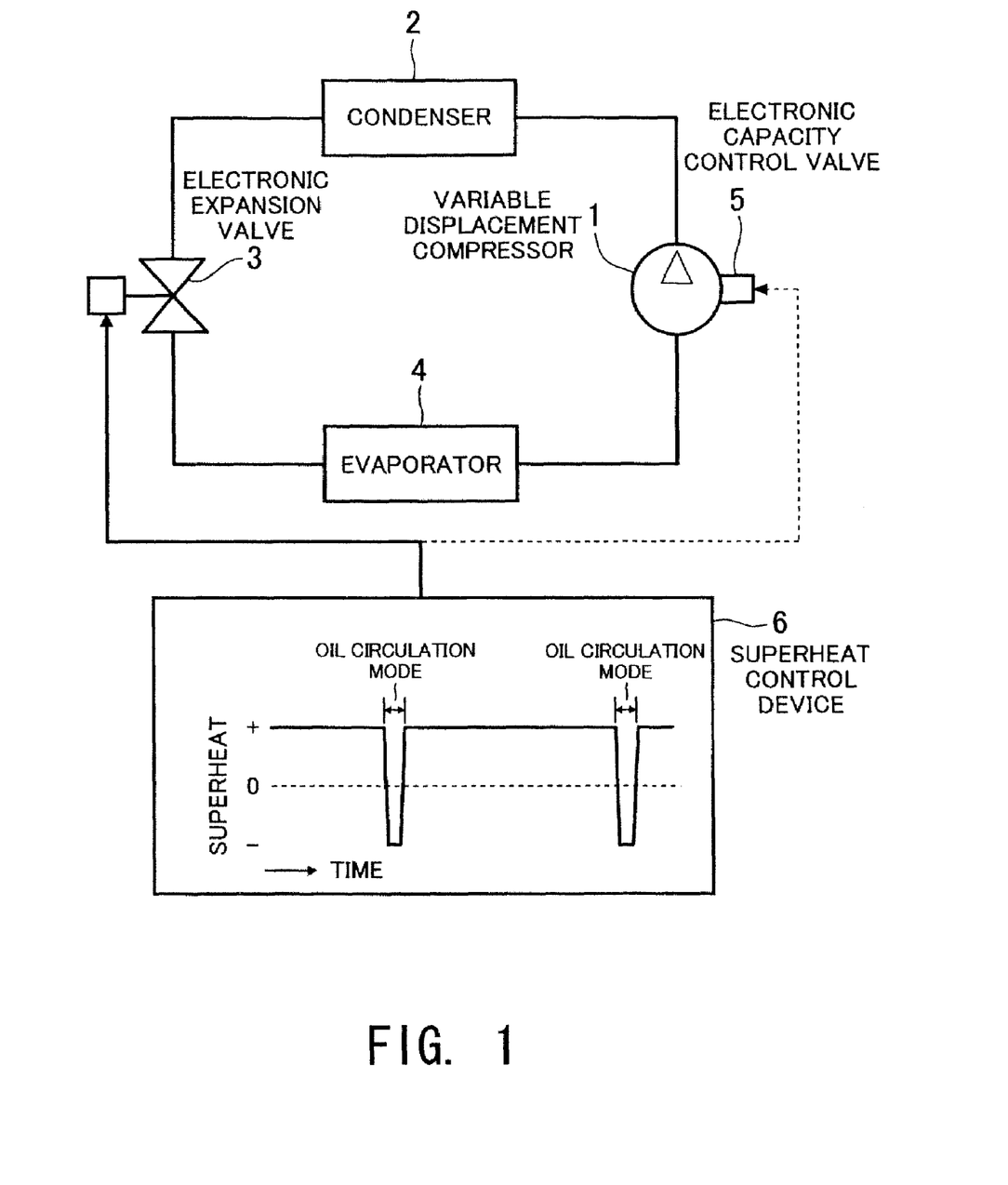
FIG. 1 is a system diagram showing a configuration of a refrigeration cycle to which the present invention is applied.
Figure 2:
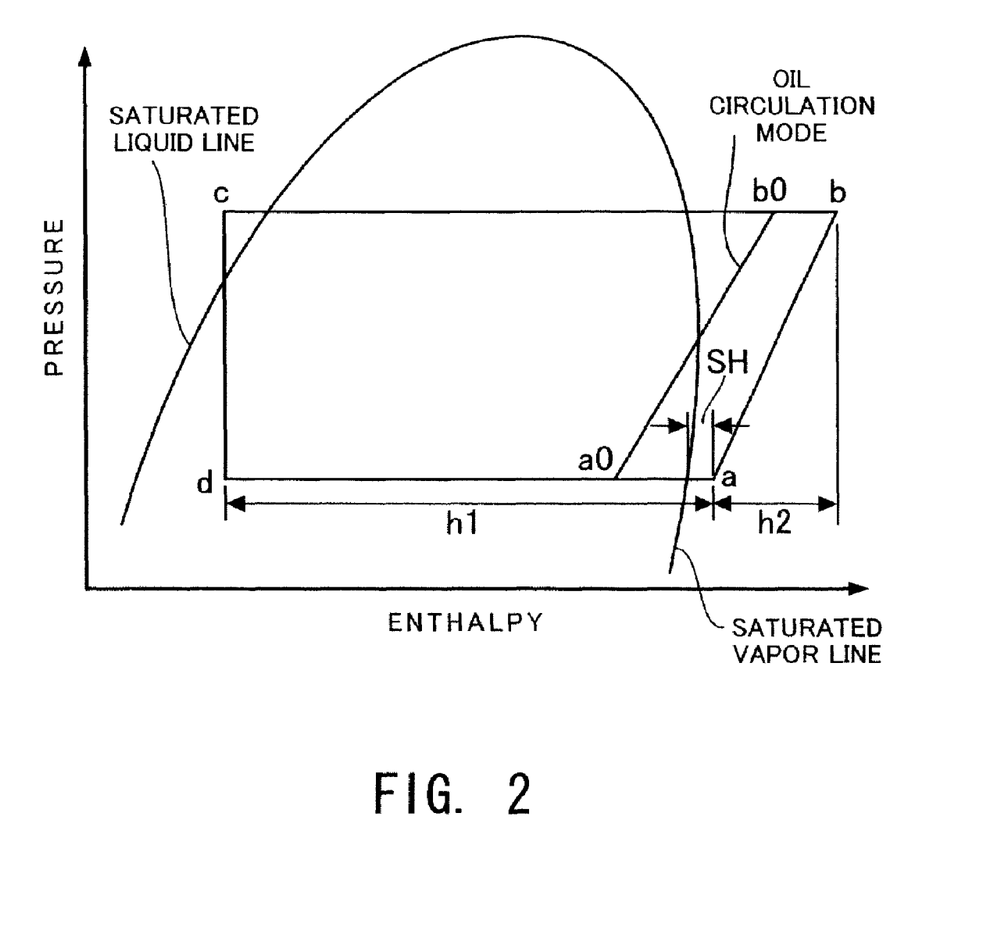
FIG. 2 is a Mollier diagram showing states of refrigerant in the refrigeration cycle.

FIG. 1 is a system diagram showing a configuration of a refrigeration cycle to which the present invention is applied, and FIG. 2 is a Mollier diagram showing states of refrigerant in the refrigeration cycle.

A refrigeration cycle comprises a variable displacement compressor 1 for compressing refrigerant, a condenser 2 for condensing the compressed refrigerant, an electronic expansion valve 3 for adiabatically expanding the condensed refrigerant, and an evaporator 4 for evaporating the adiabatically expanded refrigerant. The variable displacement compressor 1 is provided with an electronic capacity control valve 5 for controlling the discharging capacity of refrigerant. A superheat control device 6 carries out a method of operating a refrigeration cycle according to the present invention and is connected to the electronic expansion valve 3.

Operation of the refrigeration cycle configured in this manner will be described with reference to the Mollier diagram of FIG. 2. The Mollier diagram shows the states of the refrigerant in the variable displacement compressor 1, condenser 2, electronic expansion valve 3 and evaporator 4, and ordinate and abscissa axes thereof indicate absolute pressure and enthalpy, respectively.

The refrigeration cycle operates along a line a-b-c-d-a indicated on the Mollier diagram. Specifically, the variable displacement compressor 1 compresses the gaseous refrigerant evaporated by the evaporator 4 (a→b), and the resulting gaseous refrigerant whose temperature and pressure have risen due to the compression is condensed by the condenser 2 (b→c). The condensed and thus liquefied refrigerant is adiabatically expanded by the electronic expansion valve 3 (c→d), and the resulting refrigerant which has turned into a gas-liquid, two-phase refrigerant due to the adiabatic expansion is evaporated by the evaporator 4 (d→a). When evaporating in the evaporator 4, the refrigerant absorbs latent heat of vaporization from the air in the passenger compartment, thereby cooling the air in the compartment.

At this time, the electronic expansion valve 3 is controlled such that the refrigerant at the outlet of the evaporator 4 has predetermined superheat SH exceeding the saturated vapor line, like a normally charged thermostatic expansion valve, whereby the superheated refrigerant can always be supplied to the variable displacement compressor 1. Consequently, the coefficient of performance improves and the load on the engine driving the variable displacement compressor 1 lessens, so that the fuel efficiency improves. Specifically, the coefficient of performance is expressed as the ratio of the refrigerating capacity to the thermal equivalent of the required work of compression, namely, $$\text{Coefficient of Performance} = \text{Refrigerating Capacity}/\text{Thermal Equivalent of Work of Compression} \quad (1)$$

The refrigerating capacity corresponds, on the Mollier diagram, to a width h1 between a state (point d) of the refrigerant in which the refrigerant is a mixture of liquid and vapor present in the evaporator 4 and a state (point a) in which the refrigerant is superheated. The thermal equivalent of the work of compression corresponds to a width h2 between the point a at which the refrigerant is superheated and the point b at which the refrigerant has been compressed by the variable displacement compressor 1. Accordingly, the higher the refrigerating capacity (h1) of the evaporator 4 and the smaller the work (h2) of compression of the variable displacement compressor 1, the higher the coefficient of performance of the refrigeration cycle becomes. In this instance, the coefficient of performance of the refrigeration cycle is improved by controlling the electronic expansion valve 3 such that the refrigerant always has the predetermined superheat SH at the outlet of the evaporator 4.

In the case where the refrigeration cycle is operated such that the refrigerant is always in a superheated state at the outlet of the evaporator 4, the lubricating oil for the variable displacement compressor 1 is gradually retained in the evaporator 4. According to the present invention, therefore, the superheat control device 6 periodically forcibly operates the refrigeration cycle in oil circulation mode for a predetermined time.

Specifically, the superheat control device 6 controls the electronic expansion valve 3 so as to forcibly eliminate the superheat of the refrigerant at the outlet of the evaporator 4. In practice, the superheat control device 6 controls the electronic expansion valve 3 such that the refrigerant temporarily has negative superheat. This can be done because the electronic expansion valve 3 permits free setting of its characteristics, and such control cannot be achieved with a normally charged thermostatic expansion valve since it controls the refrigerant so as to always have preset superheat. In consequence, the state of the refrigerant at the outlet of the evaporator 4 shifts to a point a0 on the Mollier diagram, and the variable displacement compressor 1 compresses the refrigerant, which is a mixture of liquid and vapor, up to a point b0 on the Mollier diagram. During the oil circulation mode, the coefficient of performance of the refrigeration cycle temporarily lowers. However, since the variable displacement compressor 1 is allowed to suck in sufficiently wet refrigerant in a short period of time, not only a sufficient amount of lubricating oil can be supplied to the variable displacement compressor 1 but also the lubricating oil stayed in the evaporator 4 can be made to flow out into the compressor 1.

The intervals at which the refrigeration cycle is forcibly operated in the oil circulation mode by the superheat control device 6 may be varied in accordance with the refrigeration load. For example, when the refrigeration load is small, the intervals are set longer, and when the refrigeration load is large, the intervals are set shorter.

The following describes specific control methods that the superheat control device 6 carries out depending on the manner of how the variable displacement compressor 1 and the electronic expansion valve 3 are controlled.

First, in the case where the variable displacement compressor 1 is a constant differential pressure control type in which a differential pressure between the discharge and suction pressures thereof is controlled to a constant value by the electronic capacity control valve 5, an expansion valve of constant flow rate control type which controls the flow rate of the refrigerant to a constant value is used as the electronic expansion valve 3, in order that the control of the electronic expansion valve may not conflict with the control of the electronic capacity control valve 5.

In this case, to operate the refrigeration cycle in the oil circulation mode, the superheat control device 6 sets the constant flow rate control type electronic expansion valve 3 so as to temporarily increase the flow rate. Consequently, the flow rate of the refrigerant passing through the electronic expansion valve 3 suddenly increases, whereby the evaporator 4 can supply the variable displacement compressor 1 with the refrigerant which is not completely evaporated and thus is sufficiently wet and at the same time can cause the lubricating oil stayed therein to flow out. This is equivalent to control of the refrigerant by the superheat control device 6 such that the refrigerant has negative superheat at the outlet of the evaporator 4.

Also, where the variable displacement compressor 1 is a constant differential pressure control type and the electronic expansion valve 3 is a constant flow rate control type, the superheat control device 6 may alternatively set the electronic capacity control valve 5 in the oil circulation mode so as to temporarily decrease the differential pressure, as indicated by the broken line in FIG. 1. Setting the differential pressure between the discharge and suction pressures of the variable displacement compressor 1 to a smaller value means increasing the flow rate of the refrigerant. Thus, since the flow rate of the refrigerant sucked into the variable displacement compressor 1 suddenly increases, the compressor 1 sucks in wet refrigerant from the evaporator 4 and also the lubricating oil stayed in the evaporator 4 can be drawn out.

Further, where the variable displacement compressor 1 is a constant differential pressure control type and the electronic expansion valve 3 is a constant flow rate control type, the superheat control device 6 may simultaneously control the electronic expansion valve 3 and the electronic capacity control valve 5. Namely, the superheat control device 6 may set the electronic expansion valve 3 so as to increase the flow rate and at the same time set the electronic capacity control valve 5 so as to decrease the differential pressure.

Let us now consider the case where the electronic capacity control valve 5 is constituted by a proportional control valve capable of varying the cross-sectional area of a discharge-side refrigerant passage and a constant differential pressure valve for controlling a differential pressure between the inlet and outlet sides of the proportional control valve to a constant value and the variable displacement compressor 1 is a flow rate control type in which the discharge flow rate of the refrigerant is controlled to a constant value. In this case, a constant differential pressure control type electronic expansion valve capable of controlling a differential pressure between the inlet and outlet sides thereof to a constant value is used as the electronic expansion valve 3 so that the control of the electronic expansion valve 3 may not conflict with that of the electronic capacity control valve 5.

When operating the refrigeration cycle in the oil circulation mode, the superheat control device 6 sets the constant differential pressure control type electronic expansion valve 3 so as to decrease the differential pressure between the inlet and outlet sides thereof. This means controlling the electronic expansion valve 3 to increase the refrigerant flow rate. Consequently, the refrigerant flow rate suddenly increases, whereby the refrigerant in a wet state is supplied from the evaporator 4 to the variable displacement compressor 1, and at this time, the lubricating oil stayed in the evaporator 4 also flows out together with the refrigerant. This is equivalent to control of the refrigerant by the superheat control device 6 such that the refrigerant has negative superheat at the outlet of the evaporator 4.

Also, where the variable displacement compressor 1 is a flow rate control type and the electronic expansion valve 3 is a constant differential pressure control type, the superheat control device 6 may alternatively set the proportional control valve constituting the electronic capacity control valve 5 so as to increase the discharge flow rate during the oil circulation mode, as indicated by the broken line in FIG. 1. This rapidly increases the flow rate of the refrigerant sucked into the variable displacement compressor 1, whereby the compressor 1 sucks in wet refrigerant from the evaporator 4 and also the lubricating oil stayed in the evaporator 4 can be drawn out.

Further, where the variable displacement compressor 1 is a flow rate control type and the electronic expansion valve 3 is a constant differential pressure control type, the superheat control device 6 may control the electronic expansion valve 3 and the electronic capacity control valve 5 at the same time. Namely, the superheat control device 6 may set the electronic expansion valve 3 so as to decrease the differential pressure between the inlet and outlet sides thereof and at the same time set the proportional control valve of the electronic capacity control valve 5 so as to increase the discharge flow rate.

Let us now consider the case where the electronic capacity control valve 5 is constituted by a constant differential pressure valve for controlling a differential pressure between the inlet and outlet sides of a fixed orifice arranged in the discharge-side refrigerant passage and having a fixed cross-sectional area such that the differential pressure is constant, and the variable displacement compressor 1 is a flow rate control type in which the discharge flow rate of the refrigerant is controlled to a constant value. In this case, a constant differential pressure control type electronic expansion valve capable of controlling a differential pressure between the inlet and outlet sides thereof to a constant value is used as the electronic expansion valve 3 so that the control of the electronic expansion valve 3 may not conflict with that of the electronic capacity control valve 5.

To operate the refrigeration cycle in the oil circulation mode, the superheat control device 6 sets the constant differential pressure control type electronic expansion valve 3 so as to decrease the differential pressure between the inlet and outlet sides thereof. This means controlling the electronic expansion valve 3 to increase the refrigerant flow rate. As a result, the refrigerant flow rate suddenly increases, whereby the refrigerant in a wet state is supplied from the evaporator 4 to the variable displacement compressor 1, and at this time the lubricating oil stayed in the evaporator 4 also flows out together with the refrigerant. This is equivalent to control of the refrigerant by the superheat control device 6 such that the refrigerant has negative superheat at the outlet of the evaporator 4.

Also, where the variable displacement compressor 1 is a flow rate control type and the electronic expansion valve 3 is a constant differential pressure control type, the superheat control device 6 may alternatively set the constant differential pressure valve constituting the electronic capacity control valve 5 so as to decrease the differential pressure between the inlet and outlet sides of the fixed orifice during the oil circulation mode, as indicated by the broken line in FIG. 1. This rapidly increases the flow rate of the refrigerant sucked into the variable displacement compressor 1, whereby the compressor 1 sucks in wet refrigerant from the evaporator 4 and also the lubricating oil stayed in the evaporator 4 can be drawn out.

Further, where the variable displacement compressor 1 is a flow rate control type and the electronic expansion valve 3 is a constant differential pressure control type, the superheat control device 6 may simultaneously control the electronic expansion valve 3 and the electronic capacity control valve 5. Namely, the superheat control device 6 may set the electronic expansion valve 3 so as to decrease the differential pressure between the inlet and outlet sides thereof and at the same time set the constant differential pressure valve of the electronic capacity control valve 5 so as to decrease the differential pressure between the inlet and outlet sides of the fixed orifice.

The following describes other control methods wherein the superheat control device 6 controls the electronic capacity control valve 5 of the variable displacement compressor 1, as indicated by the broken line in FIG. 1.

In the case where the variable displacement compressor 1 is a constant differential pressure control type and the electronic expansion valve 3 is a constant flow rate control type, the superheat control device 6 first sets the electronic capacity control valve 5 so as to temporarily increase the differential pressure and then to decrease the differential pressure during the oil circulation mode.

Setting the differential pressure between the discharge and suction pressures of the variable displacement compressor 1 to a larger value means decreasing the refrigerant flow rate. Accordingly, the refrigerating capacity lowers and the evaporating pressure of the suction side rises. Subsequently, the differential pressure between the discharge and suction pressures is set to a smaller value to increase the refrigerant flow rate, so that the refrigerating capacity increases while the evaporating pressure of the suction side drops. In consequence, the refrigerant in the evaporator 4 suddenly boils, whereby the variable displacement compressor 1 can suck in the refrigerant together with the lubricating oil stayed in the evaporator 4.

In this case, the expansion valve to be used may be a normally charged thermostatic expansion valve in which the refrigerant is controlled so as to always have predetermined superheat SH at the outlet of the evaporator 4, instead of the constant flow rate control type electronic expansion valve 3. When the variable displacement compressor 1 is so set as to increase the differential pressure between the discharge and suction pressures thereof, the normally charged thermostatic expansion valve automatically operates in the valve closing direction since the evaporating pressure of the suction side rises. On the other hand, when the variable displacement compressor 1 is set so as to decrease the differential pressure between the discharge and suction pressures thereof, the normally charged thermostatic expansion valve automatically operates in the valve opening direction because of a drop in the evaporating pressure of the suction side. Thus, the normally charged thermostatic expansion valve never hinders the operation in the oil circulation mode.

Let us now consider the case where the variable displacement compressor 1 is a flow rate control type in which a differential pressure between the inlet and outlet sides of a proportional control valve capable of varying a cross-sectional area thereof is controlled to be constant by a constant differential pressure valve, to thereby control the discharge flow rate of the refrigerant to a constant value, and the electronic expansion valve 3 is a constant differential pressure control type. In this case, in the oil circulation mode, the superheat control device 6 first sets the proportional control valve constituting the electronic capacity control valve 5 so as to decrease the discharge flow rate and then to increase the discharge flow rate. First, the variable displacement compressor 1 is so set as to decrease the discharge flow rate, whereby the refrigerating capacity lowers and the evaporating pressure of the suction side rises. Subsequently, the discharge flow rate is increased; therefore, the refrigerating capacity increases and the evaporating pressure of the suction side drops. Since the refrigerant in the evaporator 4 boils all at once because of a great drop in the evaporating pressure, the refrigerant can be returned to the variable displacement compressor 1 together with the lubricating oil stayed in the evaporator 4.

Let us consider the case where the variable displacement compressor 1 is a flow rate control type in which a differential pressure between the inlet and outlet sides of a fixed orifice arranged in the discharge-side refrigerant passage is controlled to be constant by a constant differential pressure valve, to thereby control the discharge flow rate of the refrigerant to a constant value, and the electronic expansion valve 3 is a constant differential pressure control type. In this case, in the oil circulation mode, the superheat control device 6 first sets the constant differential pressure valve constituting the electronic capacity control valve 5 so as to increase the differential pressure between the inlet and outlet sides of the fixed orifice and then to decrease the differential pressure. The variable displacement compressor 1 is first set so as to increase the differential pressure between the inlet and outlet sides of the fixed orifice. Since the discharge flow rate is thus set to a smaller value, the refrigerating capacity lowers and the evaporating pressure of the suction side rises.

Subsequently, the differential pressure between the inlet and outlet sides of the fixed orifice is decreased to thereby increase the discharge flow rate; therefore, the refrigerating capacity suddenly increases while the evaporating pressure of the suction side sharply drops. Since the evaporating pressure undergoes a great drop and the refrigerant in the evaporator 4 boils all at once, the refrigerant can be returned to the variable displacement compressor 1 together with the lubricating oil stayed in the evaporator 4.

Also in the case where the flow rate control type variable displacement compressor 1 is controlled such that the discharge flow rate is once decreased and then increased, a normally charged thermostatic expansion valve may be used in place of the constant differential pressure control type electronic expansion valve 3.

As described above, the present invention has a construction such that during a normal operation, the refrigerant is controlled so as to always have superheat at the outlet of the evaporator and is periodically controlled so as to forcibly eliminate the superheat, that is, to have negative superheat, for a predetermined time. During a normal operation, therefore, the refrigeration cycle can operate with high coefficient of performance, whereby the engine which drives the variable displacement compressor can be operated at high fuel efficiency. Also, the refrigerant is temporarily controlled so as to have negative superheat. Accordingly, the lubricating oil stayed in the evaporator can be made to flow out to the variable displacement compressor, thus making it possible to prevent the variable displacement compressor from seizing due to shortage of the lubricating oil.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of operating a refrigeration cycle using an expansion valve and a variable displacement compressor having an electronic capacity control valve, wherein
   during normal operation, the refrigeration cycle is controlled such that refrigerant always has superheat at an outlet of an evaporator,
   the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
   intervals at which the refrigeration cycle is operated in the oil circulation mode are varied in accordance with a refrigeration load.

2. A method of operating a refrigeration cycle using an expansion valve and a variable displacement compressor having an electronic capacity control valve, wherein
   during normal operation, the refrigeration cycle is controlled such that refrigerant always has superheat at an outlet of an evaporator,
   the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
   the variable displacement compressor is a constant differential pressure control type in which a differential pressure between discharge and suction pressures thereof is controlled to a constant value by the electronic capacity control valve, the expansion valve is an electronic expansion valve of constant flow rate control type which controls a flow rate of the refrigerant to a constant value, and in the oil circulation mode the electronic capacity control valve is set so as to decrease the differential pressure.

3. A method of operating a refrigeration cycle using an expansion valve and a variable displacement compressor having an electronic capacity control valve, wherein
   during normal operation, the refrigeration cycle is controlled such that refrigerant always has superheat at an outlet of an evaporator,
   the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
   the variable displacement compressor is a constant differential pressure control type in which a differential pressure between discharge and suction pressures thereof is controlled to a constant value by the electronic capacity control valve, the expansion valve is an electronic expansion valve of constant flow rate control type which controls a flow rate of the refrigerant to a constant value, and in the oil circulation mode the electronic expansion valve is set so as to increase the flow rate of the refrigerant and simultaneously the electronic capacity control valve is set so as to decrease the differential pressure.

4. A method of operating a refrigeration cycle using an expansion valve and a variable displacement compressor having an electronic capacity control valve, wherein
   during normal operation, the refrigeration cycle is controlled such that refrigerant always has superheat at an outlet of an evaporator,
   the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
   the variable displacement compressor is a constant differential pressure control type in which a differential pressure between discharge and suction pressures thereof is controlled to a constant value by the electronic capacity control valve, the expansion valve is an electronic expansion valve of constant flow rate control type which controls a flow rate of the refrigerant to a constant value, and in the oil circulation mode the electronic capacity control valve is first set so as to increase the differential pressure and then to decrease the differential pressure.

5. A method of operating a refrigeration cycle using an expansion valve and a variable displacement compressor having an electronic capacity control valve, wherein during normal operation, the refrigeration cycle is controlled such that refrigerant always has superheat at an outlet of an evaporator, the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and the variable displacement compressor is a flow rate control type in which a discharge flow rate of the refrigerant is controlled to a constant value and of which the electronic capacity control valve is constituted by a proportional control valve capable of varying a cross-sectional area of a discharge-side refrigerant passage and a constant differential pressure valve for controlling a differential pressure between inlet and outlet sides of the proportional control valve to a constant value, the expansion valve is an electronic expansion valve of constant differential pressure control type in which a differential pressure between inlet and outlet sides thereof is controlled to a constant value, and in the oil circulation mode the proportional control valve is set so as to increase the discharge flow rate.

6. A method of operating a refrigeration cycle using an expansion valve and a variable displacement compressor having an electronic capacity control valve, wherein during normal operation, the refrigeration cycle is controlled such that refrigerant always has superheat at an outlet of an evaporator, the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and the variable displacement compressor is a flow rate control type in which a discharge flow rate of the refrigerant is controlled to a constant value and of which the electronic capacity control valve is constituted by a proportional control valve capable of varying a cross-sectional area of a discharge-side refrigerant passage and a constant differential pressure valve for controlling a differential pressure between inlet and outlet sides of the proportional control valve to a constant value, the expansion valve is an electronic expansion valve of constant differential pressure control type in which a differential pressure between inlet and outlet sides thereof is controlled to a constant value, and in the oil circulation mode the electronic expansion valve is set so as to decrease the differential pressure thereof and simultaneously the proportional control valve is set so as to increase the discharge flow rate.

7. A method of operating a refrigeration cycle using an expansion valve and a variable displacement compressor having an electronic capacity control valve, wherein during normal operation, the refrigeration cycle is controlled such that refrigerant always has superheat at an outlet of an evaporator, the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and the variable displacement compressor is a flow rate control type in which a discharge flow rate of the refrigerant is controlled to a constant value and of which the electronic capacity control valve is constituted by a proportional control valve capable of varying a cross-sectional area of a discharge-side refrigerant passage and a constant differential pressure valve for controlling a differential pressure between inlet and outlet sides of the proportional control valve to a constant value, the expansion valve is an electronic expansion valve of constant differential pressure control type in which a differential pressure between inlet and outlet sides thereof is controlled to a constant value, and in the oil circulation mode the proportional control valve is first set so as to decrease the discharge flow rate and then to increase the discharge flow rate.

8. A method of operating a refrigeration cycle using an expansion valve and a variable displacement compressor having an electronic capacity control valve, wherein during normal operation, the refrigeration cycle is controlled such that refrigerant always has superheat at an outlet of an evaporator, the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and the variable displacement compressor is a flow rate control type in which a discharge flow rate of the refrigerant is controlled to a constant value and of which the electronic capacity control valve is constituted by a constant differential pressure valve for controlling a first differential pressure between inlet and outlet sides of a fixed orifice arranged in a discharge-side refrigerant passage and having a fixed cross-sectional area such that the first differential pressure is constant, the expansion valve is an electronic expansion valve of constant differential pressure control type in which a second differential pressure between inlet and outlet sides thereof is controlled to a constant value, and in the oil circulation mode the electronic expansion valve is set so as to decrease the second differential pressure.

9. A method of operating a refrigeration cycle using an expansion valve and a variable displacement compressor having an electronic capacity control valve, wherein during normal operation, the refrigeration cycle is controlled such that refrigerant always has superheat at an outlet of an evaporator, the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and the variable displacement compressor is a flow rate control type in which a discharge flow rate of the refrigerant is controlled to a constant value and of which the electronic capacity control valve is constituted by a constant differential pressure valve for controlling a first differential pressure between inlet and outlet sides of a fixed orifice arranged in a discharge-side refrigerant passage and having a fixed cross-sectional area such that the first differential pressure is constant, the expansion valve is an electronic expansion valve of constant differential pressure control type in which a second differential pressure between inlet and outlet sides thereof is controlled to a constant value, and in the oil circulation mode the constant differential pressure valve constituting the electronic capacity control valve is set so as to decrease the first differential pressure.

10. A method of operating a refrigeration cycle using an expansion valve and a variable displacement compressor having an electronic capacity control valve, wherein
during normal operation, the refrigeration cycle is controlled such that refrigerant always has superheat at an outlet of an evaporator,
the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
the variable displacement compressor is a flow rate control type in which a discharge flow rate of the refrigerant is controlled to a constant value and of which the electronic capacity control valve is constituted by a constant differential pressure valve for controlling a first differential pressure between inlet and outlet sides of a fixed orifice arranged in a discharge-side refrigerant passage and having a fixed cross-sectional area such that the first differential pressure is constant, the expansion valve is an electronic expansion valve of constant differential pressure control type in which a second differential pressure between inlet and outlet sides thereof is controlled to a constant value, and in the oil circulation mode the electronic expansion valve is set so as to decrease the second differential pressure and simultaneously the constant differential pressure valve constituting the electronic capacity control valve is set so as to decrease the first differential pressure.

11. A method of operating a refrigeration cycle using an expansion valve and a variable displacement compressor having an electronic capacity control valve, wherein
during normal operation, the refrigeration cycle is controlled such that refrigerant always has superheat at an outlet of an evaporator,
the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
the variable displacement compressor is a flow rate control type in which a discharge flow rate of the refrigerant is controlled to a constant value and of which the electronic capacity control valve is constituted by a constant differential pressure valve for controlling a first differential pressure between inlet and outlet sides of a fixed orifice arranged in a discharge-side refrigerant passage and having a fixed cross-sectional area such that the first differential pressure is constant, the expansion valve is an electronic expansion valve of constant differential pressure control type in which a second differential pressure between inlet and outlet sides thereof is controlled to a constant value, and in the oil circulation mode the constant differential pressure valve constituting the electronic capacity control valve is first set so as to increase the first differential pressure and then to decrease the first differential pressure.

12. A method of operating a refrigeration cycle using an expansion valve and a variable displacement compressor having an electronic capacity control valve, wherein
during normal operation, the refrigeration cycle is controlled such that refrigerant always has superheat at an outlet of an evaporator,
the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
the variable displacement compressor is a constant differential pressure control type in which a differential pressure between discharge and suction pressures thereof is controlled to a constant value by the electronic capacity control valve, the expansion valve is a normally charged thermostatic expansion valve, and in the oil circulation mode the electronic capacity control valve is first set so as to increase the differential pressure and then to decrease the differential pressure.

13. A method of operating a refrigeration cycle using an expansion valve and a variable displacement compressor having an electronic capacity control valve, wherein
during normal operation, the refrigeration cycle is controlled such that refrigerant always has superheat at an outlet of an evaporator,
the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and
the variable displacement compressor is a flow rate control type in which a discharge flow rate of the refrigerant is controlled to a constant value and of which the electronic capacity control valve is constituted by a proportional control valve capable of varying a cross-sectional area of a discharge-side refrigerant passage and a constant differential pressure valve for controlling a differential pressure between inlet and outlet sides of the proportional control valve to a constant value, the expansion valve is a normally charged thermostatic expansion valve, and in the oil circulation mode the proportional control valve is first set so as to decrease the discharge flow rate and then to increase the discharge flow rate.

14. A method of operating a refrigeration cycle using an expansion valve and a variable displacement compressor having an electronic capacity control valve, wherein
during normal operation, the refrigeration cycle is controlled such that refrigerant always has superheat at an outlet of an evaporator,
the refrigeration cycle is periodically operated in oil circulation mode for a predetermined time, the oil circulation mode being a mode in which the refrigeration cycle is controlled such that the superheat of the refrigerant at the outlet of the evaporator is forcibly eliminated by at least one of the electronic capacity control valve of the variable displacement compressor and the expansion valve, and the variable displacement compressor is a flow rate control type in which a discharge flow rate of the refrigerant is controlled to a constant value and of which the electronic capacity control valve is constituted by a constant differential pressure valve for controlling a differential pressure between inlet and outlet sides of a fixed orifice arranged in a discharge-side refrigerant passage and having a fixed cross-sectional area such that the differential pressure is constant, the expansion valve is a normally charged thermostatic expansion valve, and in the oil circulation mode the constant differential pressure valve is first set so as to increase the differential pressure and then to decrease the differential pressure.

* * * * *